US011396595B2

(12) United States Patent
Beyer et al.

(10) Patent No.: US 11,396,595 B2
(45) Date of Patent: Jul. 26, 2022

(54) VINYLIDENE CHLORIDE COPOLYMER COMPOSITION FOR BARRIER FILM

(71) Applicant: SK SARAN AMERICAS LLC, Midland, MI (US)

(72) Inventors: Douglas E. Beyer, Midland, MI (US); Steven R. Jenkins, Sanford, MI (US)

(73) Assignee: SK Saran Americas LLC, Midland, MI (US)

( * ) Notice: Subject to any disclaimer, the term of this patent is extended or adjusted under 35 U.S.C. 154(b) by 432 days.

(21) Appl. No.: 14/432,950

(22) PCT Filed: Mar. 15, 2013

(86) PCT No.: PCT/US2013/032334
§ 371 (c)(1),
(2) Date: Apr. 1, 2015

(87) PCT Pub. No.: WO2014/055126
PCT Pub. Date: Apr. 10, 2014

(65) Prior Publication Data
US 2015/0240064 A1 Aug. 27, 2015

Related U.S. Application Data

(60) Provisional application No. 61/710,412, filed on Oct. 5, 2012.

(51) Int. Cl.
C08L 27/08 (2006.01)
B32B 27/30 (2006.01)
B32B 27/08 (2006.01)
B32B 27/22 (2006.01)
C08L 33/06 (2006.01)
C08L 33/12 (2006.01)
C08K 5/1515 (2006.01)
B65D 85/76 (2006.01)
B65D 81/26 (2006.01)

(52) U.S. Cl.
CPC ............ *C08L 27/08* (2013.01); *B32B 27/08* (2013.01); *B32B 27/22* (2013.01); *B32B 27/304* (2013.01); *B32B 27/306* (2013.01); *B32B 27/308* (2013.01); *C08K 5/1515* (2013.01); *C08L 33/06* (2013.01); *C08L 33/12* (2013.01); *B32B 2250/03* (2013.01); *B32B 2250/24* (2013.01); *B32B 2250/40* (2013.01); *B32B 2270/00* (2013.01); *B32B 2307/724* (2013.01); *B32B 2439/70* (2013.01); *B65D 81/26* (2013.01); *B65D 85/76* (2013.01); *Y10T 428/31935* (2015.04)

(58) Field of Classification Search
None
See application file for complete search history.

(56) References Cited

U.S. PATENT DOCUMENTS

| 5,202,188 A | 4/1993 | Bekele |
| 5,291,565 A | 3/1994 | Schaffner et al. |
| 5,538,770 A | 7/1996 | Bekele |
| 5,726,229 A | 3/1998 | Bekele |
| 5,914,194 A | 6/1999 | Solomon |
| 6,627,679 B1 | 9/2003 | Kling |
| 2003/0099813 A1 | 5/2003 | Bekele |
| 2009/0047494 A1 | 2/2009 | Hirata et al. |
| 2009/0123678 A1* | 5/2009 | Beyer ............... B29C 55/28 428/34.8 |
| 2011/0124780 A1 | 5/2011 | Beyer et al. |
| 2011/0144249 A1* | 6/2011 | Beyer ............... D01F 6/32 524/114 |
| 2014/0302300 A1* | 10/2014 | Beyer ............... C08K 5/1515 428/220 |

FOREIGN PATENT DOCUMENTS

| CN | 101560276 A | 10/2009 |
| EP | 0604136 A1 | 6/1994 |
| EP | 0712896 A2 | 5/1996 |
| EP | 0530622 B1 | 11/1999 |
| JP | 2000309656 | * 11/2000 |
| JP | 2007-130811 A | 5/2007 |
| JP | 2007514168 A | 5/2007 |
| JP | 2008-074908 A | 4/2008 |
| JP | 4883622 B2 | 2/2012 |
| WO | 91/08260 A1 | 6/1991 |

OTHER PUBLICATIONS

Itada et al., Machine translation of JP 2000-309656, Nov. 7, 2000.*
Leonard G. Krauskopf, Allen Godwin, Hanser Publishers, PVC Handbook Chapter 5: Plasticizers, p. 173-193, ISBNs 978-1-56990-379-7 and 1-56990-379-4. 2005.*
Richard Perdue, Vacuum Packaging, The Wiley, Encyclopedia of packaging technology, third edition, p. 1259-1262. 2009.*
Jim Clark: Chemguide—Introducing esters. 2004 (modified Jan. 2016). http://www.chemguide.co.uk/organicprops/esters/background. html.*
Chaudhary et al., Dialkyl furan-2,5-dicarboxylates, epoxidized fatty acid esters and their mixtures as bio-based plasticizers for poly(Vinylchloride), Journal of Applied Polymer Science, 132, 32. https://doi.org/10.1002/app.42382 (Year: 2015).*

(Continued)

*Primary Examiner* — Callie E Shosho
*Assistant Examiner* — John Vincent Lawler
(74) *Attorney, Agent, or Firm* — The Webb Law Firm

(57) ABSTRACT

The present disclosure is directed to a composition comprising (a) a vinylidene chloride/methyl acrylate interpolymer having greater than 6 wt % methyl acrylate mer units in the interpolymer, (b) greater than 6 wt % of an epoxy plasticizer; and (c) less than 4 wt % of an acrylate polymer. The composition exhibits a crystallization time greater than 25 minutes to crystallization at 35° C. Films made from the present composition show improved processability and find advantageous application as permeable barrier film for food packaging, for specialty food packaging, and for gassy cheese.

4 Claims, No Drawings

(56) References Cited

OTHER PUBLICATIONS

"Atofina launches new brand names for former Metablen additives", Additives for Polymers, Dec. 2002, pp. 7, Elsevier Science, retrieved from from https://vdocuments.mx/atofma-launches-new-brand-names-for-former-metablenadditives.html.
Jenkins et al., "High-Rate Extrusion of PVDC Polymers", Journal of Plastic Film & Sheeting, Apr. 1990, pp. 90-105, vol. 6.
"Metablen(R) L-1000 SD: Material Safety Data Sheet", ATOFINA Chemicals, Inc., Oct. 18, 2000, pp. 1-7.
"PIE-TICKER: Replacement brand names for Atofina's "Metablen"", Plasteurope.com, Oct. 21, 2002, pp. 1, retrieved from https://www.plasteurope.com/news/PIE-TICKER 115485/.
"PLAS-CHEK 775", Copyright 2000-2004, Infochems, Inc., retrieved from http://www.infochems.co.kr/chemdb/product_content.asp?product_id=38691.
"Plastistrength(TM) L1000: Material Safety Data Sheet", ATOFINA Chemicals, Inc., Feb. 4, 2003, pp. 1-7.
Sworn Declaration (Affidavit) executed by Ms. Isabelle Chaduc, Aug. 21, 2020, pp. 1-4.

\* cited by examiner

VINYLIDENE CHLORIDE COPOLYMER COMPOSITION FOR BARRIER FILM

CROSS REFERENCE TO RELATED APPLICATIONS

This application claims priority from U.S. Provisional Application No. 61/710,412, filed Oct. 5, 2012.

FIELD

The present disclosure is directed to vinylidene chloride-based compositions.

BACKGROUND

Vinylidene chloride polymers are known to be useful in the fabrication of packaging films for oxygen-sensitive materials, such as food products. Gassy cheeses are specialty food products which give off substantial amounts of $CO_2$ after packaging. Although gassy cheeses require some oxygen protection, the packaging bag must also be able to expel the excess $CO_2$ produced during the cheese curing process. Many specialty food products, such as gassy cheese, require a packaging film that functions as a permeable barrier.

Vinylidene chloride polymers, however, experience problems when formed into permeable barrier films. Conventional vinylidene chloride resins crystallize rapidly. With rapid crystallization, conventional vinylidene chloride resins become rigid during post-extrusion procedures such as drawing, forming, and orienting. Rapid crystallization during such post-extrusion procedures results in unacceptable film breaks and tears.

The art recognizes the need for a vinylidene chloride resin with improved post-extrusion processability. A need further exists for a vinylidene chloride resin with improved post-extrusion processability and permeable barrier properties suitable for specialty food product packaging.

SUMMARY

The present disclosure is directed to compositions comprising a vinylidene chloride/methyl acrylate interpolymer, an epoxy plasticizer, and an acrylate polymer. Films made from the present composition exhibit improved processability and find advantageous application as permeable barrier film for food packaging, such as specialty food packaging such as gassy cheese.

In an embodiment, the composition includes:

(a) A vinylidene chloride/methyl acrylate interpolymer having greater than 6 wt % methyl acrylate mer units in the interpolymer;

(b) Greater than 6 wt % of an epoxy plasticizer; and (c) Less than 4 wt % of an acrylate polymer.

In an embodiment, the composition exhibits a crystallization time greater than 25 minutes to crystallization at 35° C.

The present disclosure provides an article. The article includes the present composition. The article may be selected from a film, a sheet, a fiber, and combinations thereof.

DETAILED DESCRIPTION

The present disclosure provides a composition. In an embodiment, the composition includes (a) vinylidene chloride/methyl acrylate interpolymer, (b) an epoxy plasticizer, and (c) an acrylate polymer. The vinylidene chloride/methyl acrylate interpolymer has greater than 6 wt % methyl acrylate mer units in the interpolymer. The composition also contains greater than 6 wt % of the epoxy plasticizer. The composition further contains less than 4 wt % of the acrylate polymer.

Vinylidene Chloride

The present composition includes a vinylidene chloride/methyl acrylate interpolymer. Vinylidene chloride polymers or "VDC" are also known as vinylidene chloride resins, interpolymers of vinylidene chloride, vinylidene chloride interpolymers, and copolymers of vinylidene chloride. As used herein, the term "interpolymer of vinylidene chloride," "vinylidene chloride interpolymer" or "PVDC" encompasses copolymers, terpolymers, and higher polymers wherein the major component is vinylidene chloride, optionally having one or more mono-ethylenically unsaturated monomer (monounsaturated comonomer) copolymerizable with the vinylidene chloride monomer such as vinyl chloride, alkyl acrylates, alkyl methacrylates, acrylic acid, methacrylic acid, itaconic acid, acrylonitrile, and methacrylonitrile.

In an embodiment, vinylidene chloride is copolymerized with methyl acrylate (MA). The vinylidene chloride polymer comprises monomer units from vinylidene chloride and methyl acrylate (hereafter "PVDC/MA"). The PVDC/MA interpolymer has greater than 6 wt % methyl acrylate mer units in the polymer As used herein, the term "mer unit" is that portion of an interpolymer derived from a single reactant molecule, or a single monomer molecule. For example, a mer unit from ethylene has the general formula —$CH_2$—$CH_2$—.

In an embodiment, the PVDC/MA interpolymer is formed from a monomer mixture comprising 90 wt % to 94 wt % vinylidene chloride monomer and from 6 wt % to 10 wt % methyl acrylate monomer. Weight percent is based on total weight of the PVDC/MA interpolymer.

In an embodiment the PVDC/MA interpolymer contains greater than 6% MA, or greater than 6.5% MA, or greater than 7% MA to 9% MA, or 9.5% MA, or 10% MA with respective reciprocal amounts of VDC (i.e., 93.5/6.5, 93/7, 91/9, 90.5/9.5, 90/10 VDC/MA monomer mixture(s)).

In an embodiment, the PVDC interpolymer contains no, or substantially no, vinyl chloride monomer.

Epoxy Plasticizer

The present composition includes an epoxy plasticizer. The epoxy plasticizer has a molecular weight of a least 600 Daltons. In an embodiment, the epoxy plasticizer has a molecular weight of at least 600 Daltons, or 700 Daltons, or 800 Daltons to 2,000 Daltons, or 5,000 Daltons, or 10,000 Daltons.

In an embodiment, the epoxy plasticizer is epoxidized oil. Nonlimiting examples of suitable epoxidized oils include epoxidized soybean oil, epoxidized linseed oil, and combinations thereof.

The amount of epoxy plasticizer present in the composition is 6 or more wt %, or 7 or more wt %, or 8 wt % to 10 wt %, or 12 wt %, or 13 wt %, or 14 wt %, or 15 wt %. Weight percent is based on total weight of the composition.

Acrylate Polymer

The present composition includes an acrylate polymer. In an embodiment, the acrylate polymer may be a methacrylic polymer. The methacrylic polymer can be prepared from monomers comprising at least one alkyl methacrylate monomer, or a combination thereof, optionally with at least one alkyl acrylate or styrenic monomer or a combination thereof;

that is, having mer units from the alkyl methacrylate monomer or monomers and optionally from alkyl acrylate monomer or monomers.

In an embodiment, the methacrylic polymer comprises methyl methacrylate, in an amount of at least 30, or at least 40, or at least 50 wt %, and at least one additional methacrylic or acrylic alkyl ester or styrenic monomer or combination thereof, or at least one additional methacrylic or acrylic alkyl ester. The alkyl groups of the alkyl acrylate and methacrylate monomers have at least 1 carbon atom, to at most 16 carbon atoms, or at most 8 carbon atoms, or at most 4 carbon atoms.

In an embodiment, the methacrylic polymer comprises methacrylate and acrylate ester monomers, for polymerization with methyl methacrylate including such monomers as methyl acrylate, ethyl acrylate, butyl acrylate, ethyl methacrylate, butyl methacrylate, styrenic monomers such as styrene, alpha-methyl styrene, para-methyl styrene, para-tert-butyl styrene, and combinations thereof.

In an embodiment the methacrylic polymer has a polymer molecular weight of at least 100,000, or at least 150,000, or at least 200,000, to at most 4,000,000, or at most 700,000, or at most 400,000 Daltons.

In an embodiment, the methacrylic polymer has at least one glass transition temperature from at least 30° C. to less than 105° C., or less than 95° C.

In an embodiment, the acrylate polymer is a polymer comprising an acrylate monomer, a methacrylate monomer, a styrene monomer, and combinations thereof. Nonlimiting examples of suitable acrylate polymer include methyl acrylate, butyl acrylate, methyl methacrylate, butyl methacrylate and styrene.

In an embodiment, the acrylate polymer is an interpolymer of methyl methacrylate, butyl methacrylate and butyl acrylate.

The amount of acrylate polymer present in the composition is from 0.5 wt %, or 1 wt %, or 2 wt %, to 3 wt %, or 3.5 wt % to less than 4 wt %, or 4 wt %. Weight percent is based on total weight of the composition.

The acrylate polymer may be incorporated by dry blending an acrylate polymer with the PVDC polymer. Another alternative technique is to add an acrylate polymer in the form of latex to aqueous slurry of PVDC resin and then adding a coagulant to coagulate the acrylate polymer on the surface of the PVDC resin. Further information on the coagulation process can be found in Kling, U.S. Pat. No. 6,627,679.

Additives

The present composition may optionally include one or more additives. Nonlimiting examples of suitable additives include UV stabilizers, heat or thermal stabilizers, acid scavengers, pigments, processing aids, lubricants, fillers, antioxidants, and any combination thereof.

The composition may include from 0 wt %; or greater than 0 wt %, or 2 wt % to 5 wt % to 10 wt % additive.

In an embodiment, the composition includes from:
(a) Greater than 86 wt % to 93.5 wt % PVDC/MA interpolymer, the interpolymer having from 6.5% to 9% methyl acrylate mer units in the polymer;
(b) Greater than 6 wt % to 10 wt % epoxidized soybean oil; and
(c) 0.5 wt % to less than 4 wt % of an acrylate polymer that is an interpolymer of methyl methacrylate, butyl methacrylate and butyl acrylate.

The present composition has a crystallization time greater than 25 minutes, or greater than 50 minutes, or greater than 75 minutes, to 170 minutes, or 200 minutes, or 250 minutes to crystallization at 35° C.

In an embodiment, the composition has an oxygen transmission rate (OTR) from 1.5 to 15.0 cc-mil/100 in$^2$-atm-day at 50% relative humidity and 23° C. In a further embodiment, the composition has an OTR from 1.5, or 1.8, or 2.0 to 3.0, or 4.0, or 5.0, or 6.0, or 7.0 to 9.0, or 14.0 or 15.0 cc-mil/100 in$^2$-atm-day.

Other factors being equal, it is known that increasing the amount of plasticizer in PVDC-based barrier film resin increases the crystallization rate of the resin. In particular, PVDC-based barrier film resin with greater than 6 wt % plasticizer has a faster crystallization rate when compared to PVDC-based barrier film resin with less than 6 wt % plasticizer.

Applicant surprisingly discovered a composition with a unique balance between (1) MA content in the PVDC/MA interpolymer, (2) the amount of epoxy plasticizer, and (3) the amount of acrylate polymer. The present composition contains greater than 6 wt % epoxy plasticizer yet unexpectedly exhibits a slow crystallization rate (i.e., greater than 25 minutes time to crystallization at 35° C.). Bounded by no particular theory, it is believed that the acrylate moieties interact with the vinylidene moieties in the present composition to inhibit the nucleation and growth of crystals and slow crystallization rate, thereby enabling the present composition to exhibit a crystallization time greater than 25 minutes to crystallization at 35° C.

The crystallization time exhibited by the present composition improves processability. The crystallization time of greater than 25 minutes to 250 minutes to crystallization at 35° C. enables the present composition to remain amorphous during post-extrusion procedures such as stretching, orientation (mono-/bi-axial), and thermoforming. By remaining amorphous or "rubbery" during post-extrusion, the present composition is better adapted for stretch and other post-extrusion manipulation. The crystallization time of greater than 25 minutes to 250 minutes to crystallization at 35° C. exhibited by the present composition makes the resin more resistant to splitting and breakage during post-extrusion procedures.

In addition to the improved processability, the present composition also provides desirable barrier properties for food applications, such as a permeable barrier for gassy cheese for example. When formed as a barrier film, the present composition provides an OTR from 1.5 to 15.0 cc-mil/100 in$^2$-atm-day. This unique combination of improved processability (crystallization time of greater than 25 minutes to 250 minutes to crystallization at 35° C.) with permeable barrier property exhibited by the present composition is surprising and unexpected.

The present composition may comprise two or more embodiments disclosed herein.

Article

The present disclosure provides an article. The article includes the present composition. In an embodiment, the article is selected from a film (monolayer or multi-layer), a sheet, a fiber, and combinations thereof.

In an embodiment, the article is a packaging film. The packaging film includes one or more layers composed of the present composition. The packaging film has an oxygen transmission rate from 1.5 to 15.0 cc-mil/100 in$^2$-atm-day.

In an embodiment, the article is a multi-layer film. The multi-layer film includes first and second surface layers and one or more inner layers disposed between the surface layers. At least one inner layer includes the present composition. In particular, an inner layer of the multi-layer film includes the composition composed of:
 (a) A vinylidene chloride/methyl acrylate interpolymer having greater than 6 wt % methyl acrylate mer units in the interpolymer;
 (b) Greater than 6 wt % of an epoxy plasticizer; and
 (c) Less than 4 wt % of an acrylate polymer.

In an embodiment, the surface layers of the multi-layer film include one or more polyolefin materials. The polyolefin materials are selected from propylene-based polymers, ethylene-based polymers (such as low density polyethylene, branched low density polyethylene, linear low density polyethylene and very low density polyethylene), and ethylene vinyl acetate copolymers (EVA), and combinations thereof.

In an embodiment, the multi-layer film has an oxygen transmission rate of 1.5 to 15.0 cc-mil/100 in$^2$-atm-day.

In an embodiment, the multi-layer film has an A/B/A structure of polyolefin surface layer (A)/present composition (B)/polyolefin surface layer (A).

In an embodiment, the multi-layer film has an A/C/B/C/A structure. The (A) layers are polyolefin. The (B) layer is the present composition. The (C) layers are tie layers such as ethylene vinyl acetate copolymer.

In an embodiment, the multi-layer film has an A/C/D/B/D/C/A structure. Layers (A) are polyolefin. Layer (B) is the present composition. Layers (C) are tie layers such as EVA. Layers (D) are tie layers of an ethylene acrylate polymer.

The present article may comprise two or more embodiments disclosed herein.

DEFINITIONS

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "crystallization" as used herein means the rearrangement of a portion of polymer molecules into more organized, denser structures commonly called crystallites, measurable by differential scanning calorimetry. Polymer crystallization normally occurs during the transformation of a semi-crystalline polymer from the molten to solid state.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "polymer molecular weight" is used herein to designate the weight average molecular weight in Daltons. It is measured by size exclusion chromatography using polystyrene calibration.

The term "plasticizer" as used herein refers to a substance or material incorporated into a polymer composition to increase the flexibility, pliability or softness of the polymer or a final product made from it, for instance a film or fiber. Usually, a plasticizer lowers the glass transition temperature of the plastic, making it softer. However, strength and hardness often decrease as a result of added plasticizer.

Test Methods

Crystallization time is measured with a differential scanning calorimeter (DSC). The DSC is set to an isothermal mode at the desired test temperature and is allowed to stabilize at that temperature. A 10 mg sample of melt mixed resin is weighed and placed into a sample pan which is hermetically sealed. The sample is then melted at 185° C. for 75 seconds and then the sample is immediately quenched by placing it on a room temperature metal bar for 15 seconds. The sample is then placed in the DSC cell and set to the desired test temperature. The test starts when the sample is within 0.3° C. degrees of the setpoint. The test continues isothermally resulting in an exothermic peak associated with crystallization of the sample. The time to peak maximum is recorded as the crystallization rate in units of minutes. A higher crystallization time corresponds to a slower crystallization rate.

The reported crystallization time can be measured by two means. The crystallization time can be measured in three replicates at 35° C. For samples that crystallize very slowly at 35° C., crystallization time can alternatively be measured at three higher temperatures (e.g. 50° C., 60° C. and 70° C.). The crystallization time at 35° C. can then be extrapolated from the higher temperature data by plotting the natural log of the crystallization time versus 1/temperature in degrees Kelvin.

Oxygen transmission rate (OTR) is determined in accordance with ASTM D 3985 at 50% relative humidity and 23° C. on both the permanent and carrier side using a MOCON OXTRAN 2/21.

Some embodiments of the present disclosure will now be described in detail in the following Examples.

EXAMPLES

Materials

Materials for inventive examples and comparative samples are reported in Table 1.

TABLE 1

| Component | Specification | Source |
| --- | --- | --- |
| PVDC/MA | MA content 7.5-7.7 wt % | |
| Epoxy plasticizer PlasChek 775 | Epoxidized soybean oil- light amber liquid, Oxirane value - 7.0, Vapor pressure 8.4 × 10−8 Pa @ 25° C. | Ferro |
| Acrylate polymer Plastistrength ™ L1000 | 2-Propenoic acid, 2-methyl-,butyl ester, polymer with butyl 2-propenoate and methyl 2-methyl-2-propenoate (free flowing white powder, specific gravity 1.17, volatiles 1.2% max, bulk density, 300-600 g/l) | Arkema |

TABLE 1-continued

| Component | Specification | Source |
|---|---|---|
| Polyolefin process aid (comparative A) | As discussed in U.S. Pat. No. 5,002,989, the entire content of which is incorporated by reference herein. | |

Preparation of film

Composition 1

Examples 1-4

A vinylidene chloride/methyl acrylate interpolymer resin with a methyl acrylate content of 7.5 wt % and 1 wt % epoxidized soybean oil is blended with additional epoxidized soybean oil (plasticizer) to yield examples with different total weight percent epoxy plasticizer as shown in Table 2. PLASTISTRENGTH™ L1000 (acrylate polymer) is added and blended with the other components. The resultant blend (Composition 1) is extruded into a tape (0.012 inch thick) to melt mix the blend. Extrusion is performed using a WELEX 1.75" extruder, with a temperature profile of 127° C. to 174° C. and an extrusion rate of 50 pounds per hour (lb/h). The properties for Examples 1-4 (Composition 1) are reported in Table 2.

Composition 2

Example 5

A vinylidene chloride/methyl acrylate interpolymer resin with a methyl acrylate content of 7.7 wt % and 10 wt % epoxidized soybean oil (plasticizer) is blended with 2 wt % PLASTISTRENGTH™ L1000 (acrylate polymer). The resultant blend is extruded into a tape (0.012 inch thick) to melt mix the blend in the same manner as Examples 1-4.

Coextruded film samples of approximately 2.8 mil thickness and 10% vinylidene chloride copolymer (Composition 2) are prepared. The coextruded film is a seven layer structure of polyethylene/ethylene vinyl acetate copolymer/ethylene methyl acrylate-copolymer/Composition-2/ethylene-methyl-acrylate copolymer/ethylene-vinyl-acetate copolymer-/polyethylene. The OTR is measured to be 2.8 cc-mil/100 in$^2$-atm-day (which is acceptable for permeable barrier film applications such as food packaging for gassy cheese). The properties of Example 5 (Composition 2) are reported in Table 2.

Comparative Sample A

A vinylidene chloride/methyl acrylate interpolymer resin with a methyl acrylate content of 7.5 wt % and 1 wt % epoxidized soybean oil is blended with additional 9 wt % epoxidized soybean oil and then further blended with 1.3 wt % polyolefin processing aid from Table 1. The resultant blend (Comparative Sample A) is extruded into a tape (0.012 inch thick) to melt mix the blend, in the same manner as Examples 1-5. The results are reported in Table 2.

The crystallization rates for Compositions 1 and 2 and Comparative Sample A are measured by DSC (TA instruments Q10 properly calibrated with indium and water) and reported in Table 2. The DSC is set to an isothermal mode at the desired test temperature and allowed to stabilize at that temperature. The crystallization rate test is measured by weighing approximately 10 mg of melt mixed resin into a sample pan which is hermetically sealed. The sample is then melted at 185° C. for 75 seconds and then the sample is immediately quenched by placing it on a room temperature metal bar for 15 seconds. The sample is then placed in the DSC cell set to the desired test temperature. The test starts when the sample is within 0.3° C. degrees of the setpoint. The test continues isothermally resulting in an exothermic peak associated with crystallization of the sample. The time to peak maximum is recorded as the crystallization rate in units of minutes. A higher value corresponds to slower crystallization rate.

The reported crystallization rate value can be measured by two means. The crystallization rate can be measured in three replicates at 35° C. For samples that crystallize very slowly at 35° C., crystallization rate can alternatively be measured at three higher temperatures (e.g. 50° C., 60° C. and 70° C.). The crystallization rate at 35° C. can then be extrapolated from the higher temperature data by plotting the natural log of the crystallization rate versus 1/temperature in degrees Kelvin.

TABLE 2

| Sample | % MA In Interpolymer % | VDC/MA Interpolymer % | Epoxy Plasticizer % | Acrylate polymer % | Crystallization rate min | Pass/Fail | OTR |
|---|---|---|---|---|---|---|---|
| Example 1 | 7.5 | 88 | 10 | 2 | 25 | Pass | |
| Example 2 | 7.5 | 90 | 8 | 2 | 43 | Pass | |
| Example 3 | 7.5 | 86 | 10 | 4 | 47 | Pass | |
| Example 4 | 7.5 | 88 | 8 | 4 | 70 | Pass | |
| Example 5 | 7.7 | 88 | 10 | 2 | 52 | Pass | 2.8 |
| Comparative Example A | 7.5 | 88.7** | 10 | 0 | 16 | Fail | |

*Pass indicates a crystallization time of at least 25 minutes, fail is a crystallization time of less than 24 minutes
**composition also includes 1.3% polyolefin process aide
Wt % based on total weight composition (% MA based on total wt VDC/MA interpolymer)

Examples 6-9

Vinylidene chloride/methyl acrylate interpolymer resin with a methyl acrylate content of 8.5 wt % and containing 1.75 wt % epoxidized soybean oil and 2.0 wt % PLASTISTRENGTH L1000 (added via the coagulation process as described in U.S. Pat. No. 6,627,679) is blended with additional epoxidized soybean oil to yield compositions with different total weight percent epoxy plasticizer as reported in Table 3. The blend mixtures are heated for 3 hours at 60° C. to allow the epoxidized soybean oil to soak into the polymer. The blends are then extruded into tape (0.012 inch thick). The extrusions are performed using a WELEX 1.75" extruder, with a temperature profile of 127° C. to 174° C. and an extrusion rate of 50 lb/h. The properties of the compositions of Examples 6-9 are reported in Table 3.

TABLE 3

| Sample | % MA In Interpolymer % | VDC/MA Interpolymer % | Epoxy Plasticizer % | Acrylate polymer % | Crystallization rate min | Pass/Fail | OTR |
|---|---|---|---|---|---|---|---|
| Example 6 | 8.5 | 91 | 7 | 2 | 167 | Pass | 1.5 |
| Example 7 | 8.5 | 90 | 8 | 2 | 140 | Pass | 2.0 |
| Example 8 | 8.5 | 88 | 10 | 2 | 105 | Pass | 3.0 |
| Example 9 | 8.5 | 86 | 12 | 2 | 85 | Pass | 8.1 |

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A packaging film for food application comprising a composition comprising:
   (A) from 86 wt % to 91 wt % of a vinylidene chloride/methyl acrylate interpolymer having from 7.7 wt % to 8.5 wt % methyl acrylate mer units in the interpolymer;
   (B) from 7 wt % to 10 wt % of an epoxy plasticizer that is epoxidized soybean oil based on total weight of the composition; and
   (C) from 2 wt % to less than 4 wt % of an acrylate polymer based on total weight of the composition, the acrylate polymer consisting of an interpolymer of methyl methacrylate, butyl methacrylate, and butyl acrylate; wherein
   (D) the composition has a crystallization time greater than 50 minutes to crystallization at 35° C. measured with a differential scanning calorimeter; and
   (E) the composition has an oxygen transmission rate of 1.5 to 9.0 cc-mil/100 in$^2$-atm-day as measured in accordance with ASTM D 3985,
   wherein the packaging film expels $CO_2$ generated from food.

2. The packaging film for food application of claim 1 wherein the epoxy plasticizer has a molecular weight greater than 600 Daltons.

3. A multi-layer film for food application comprising:
   (A) first and second surface layers; and
   (B) an inner layer disposed between the surface layers, the inner layer comprising the packaging film of claim 1.

4. The multi-layer film for food application of claim 3 wherein the multi-layer film is in contact with a gassy cheese.

* * * * *